(12) United States Patent
Kovrigin et al.

(10) Patent No.: US 7,814,030 B2
(45) Date of Patent: Oct. 12, 2010

(54) SYSTEMS AND METHODS FOR MANAGING ENTERPRISE IT SUPPORT PLANNING

(75) Inventors: Oleg Kovrigin, Berlin (DE); Erik Masing, Berlin (DE)

(73) Assignee: Alfabet AG, Berlin (DE)

( * ) Notice: Subject to any disclaimer, the term of this patent is extended or adjusted under 35 U.S.C. 154(b) by 907 days.

(21) Appl. No.: 11/270,331

(22) Filed: Nov. 9, 2005

(65) Prior Publication Data

US 2007/0106642 A1 May 10, 2007

(51) Int. Cl.
*G06Q 30/00* (2006.01)
*G06Q 10/00* (2006.01)
*G06F 7/00* (2006.01)

(52) U.S. Cl. .................... 705/348; 705/342; 707/736
(58) Field of Classification Search .............. 707/1, 707/10, 736, 726; 705/1, 7, 301, 342, 348; 717/102
See application file for complete search history.

(56) References Cited

U.S. PATENT DOCUMENTS

| | | | |
|---|---|---|---|
| 6,601,233 B1 * | 7/2003 | Underwood | 717/102 |
| 7,162,427 B1 * | 1/2007 | Myrick et al. | 705/1 |
| 2003/0158800 A1 * | 8/2003 | Pisello et al. | 705/35 |
| 2004/0059611 A1 * | 3/2004 | Kananghinis et al. | 705/7 |
| 2004/0111284 A1 * | 6/2004 | Uijttenbroek | 705/1 |

* cited by examiner

*Primary Examiner*—Greta L Robinson
*Assistant Examiner*—MD. I Uddin
(74) *Attorney, Agent, or Firm*—Sutherland Asbill & Brennan LLP

(57) ABSTRACT

An integrated enterprise IT architecture planning system and method of planning the IT support of the enterprise business architecture that is based on a central database of record. Within this database of record, the current status of the IT support is documented, the desired target status of the IT support is defined and maintained, and operational plans for future IT support are created, reviewed, and consolidated. Based on the information captured in the database of record, full transparency is achieved, mutual consistency across the current, planned, and target status of the IT support can be analyzed, and target plans can be effectively enforced. Business support maps are directly generated from the central database of record, and are the central mechanism for presentation and input of information throughout the method. Any changes performed on such maps feed directly back into the database of record, updating the underlying information.

12 Claims, 13 Drawing Sheets

Fig. 1 - Prior Art

SYSTEMS AND METHODS FOR MANAGING ENTERPRISE IT SUPPORT PLANNING

FIELD OF THE INVENTION

The present invention relates to a system and a method for managing enterprise Information Technology (IT) support planning.

BACKGROUND OF THE INVENTION

In various business enterprises the organizational structure of the enterprise, the business processes it performs, and the products it produces are supported by information technology (IT), applications and services. An example for such support is the IT application Lotus Notes used by the organization Business Unit Consumer Products in the business process Marketing Campaign Management. Enterprises spend a massive amount of resources on information technology to support their business, but major inefficiencies exist today due to sub-optimal methods employed in planning such support.

In the prior art, techniques exist to represent and visualize the support that IT applications provide for organizational units in performing their business processes. The primary means of such visualization are business support maps, which represent the supporting relation using a matrix structure with the supported elements constituting the axes of the matrix and the supporting elements placed in matrix cells at the appropriate locations. FIG. 1 is an example of a business support map that visualizes IT support for organizational units in performing business processes, according to the prior art. As shown in FIG. 1, the X-axis of the matrix shows business processes, while the Y-axis shows organizational units. The placement of the element Lotus Notes in the cell corresponding to business process Marketing Campaign Management on the X-axis and to organizational unit Business Unit Consumer Products on the Y-axis represents the support of said organizational unit in performing the business process by the Lotus Notes IT application.

Use of business support maps to document and communicate the support of IT applications for the enterprise business architecture is common practice. However, this practice is based on manual creation and maintenance of such business support maps using tools like Microsoft PowerPoint, effectively creating business support maps as drawings with no associated data on the underlying IT applications, organizations, business processes, and their mutual relations. Consequently, such drawings are not related to each other, but exist as independent pieces of information.

This common practice approach has a number of drawbacks. For instance, business support maps need to be created and updated manually, which is time consuming and error prone. Moreover, no direct links are available from a business support map to the underlying information for drill-down (e.g., to understand details of an IT application that is shown as providing support), and no mutual consistency checks across multiple such maps are possible. Further, time-based planning of the evolution of the IT support of the enterprise business architecture relies on a series of unrelated drawings, making the planning process opaque, tedious, and error prone. Finally, modifying plans requires updating a number of drawings and documents, as these are technically independent of each other.

Techniques also exist to establish a planning regime that institutionalizes and guides the planning of future IT support of the enterprise business architecture. The aim of such a regime is to define guidelines and long-term targets for future IT support (e.g., by dictating that in 2010, all business processes related to marketing shall be supported by a specific IT application from a specific vendor) to coordinate, review, and consolidate the plans for IT support that are made in operational planning activities, and to establish full transparency of the current, planned, and long-term target status of the IT support.

The prior art techniques employed to establish such planning regimes rely on: the definition of long-term targets for IT support by a small group of enterprise architects, the documentation of such targets in the form of business support map drawings, and the dissemination of this information in the form of documents or pictures to planners performing operational planning. Moreover, the prior art techniques rely on the conception of future IT support in the scope of operational planning, the documentation of such plans in the form of business support map drawings, and the submission of such drawings to respective review boards or central groups for review. Also relied on in the prior art is the publication of approved long-term and operational plans in the form of documents or pictures (e.g., using content management systems and intranet publication) to inform all stakeholders and the establishment of policies and processes to enforce the detailed planning and review procedures.

The combination of the above techniques to establish planning regimes suffer from serious difficulties. For instance, communication among stakeholders in the process is based on documents or pictures that are not associated with an underlying database of record, effectively rendering every document an island of information without any semantic relation among such documents. Consequently, mutual consistency of operational plans or compliance with target plans need to be verified manually by reading and reviewing a great number of documents and drawings without any assistance from an automated system. This process is labor intensive and error prone. Further, the rate of change of such documents and drawings and the huge number of plans in larger enterprises render the outcome of the approach grossly suboptimal. Also, the publication of a consolidated view on the current, planned, and target state of the IT support for the enterprise business architecture is limited to a fragmented collection of documents and drawings, which are not consolidated into a coherent whole.

Effectively, the prior art techniques fail to achieve their goal of coordinating and directing the planning process of future IT support. They especially fall short in ensuring consistency of plans, both mutual consistency of operational plans and consistency with target plans. These shortcomings contribute significantly to the major inefficiencies in the use of IT to support the business.

SUMMARY OF THE INVENTION

It is the object of the invention to provide a system and a method for managing enterprise IT support as an integrated solution for facilitating enterprise architecture planning in the context of and derived from the business strategy of the enterprise.

According to the invention a computer-based system to manage enterprise Information Technology (IT) support planning is provided, which includes a central database of record an IT support planning system in communication with the central database of record, and at least one software module configured for receiving business information items on an enterprise business architecture, documenting the business information items in the central database of record, and mutually relating the received business information items. The software module may be further configured for receiving IT application information items on IT applications and documenting the IT application information items in the central database of record; receiving IT support information items on an IT support provided by the IT applications to the enterprise business architecture documenting the IT support information items in the central database of record; relating the IT applications to the enterprise business architecture according to the received IT support information items; and receiving a request for a business IT support map and providing the business IT support map according to the request.

In one exemplary embodiment of the invention, a computer-readable medium having computer-executable instructions for managing enterprise IT support planning is provided, where the computer-executable instructions include instructions for receiving business information items on an enterprise business architecture, documenting the business information items in the central database of record, and mutually relating the received business information items; receiving IT application information items on IT applications and documenting the IT application information items in the central database of record; receiving IT support information items on an IT support provided by the IT applications to the enterprise business architecture and documenting the IT support information items in the central database of record; relating the IT applications to the enterprise business architecture according to the received IT support information items; and receiving a request for a business IT support map and providing the business IT support map according to the request.

In another exemplary embodiment of the invention, the enterprise architecture planning method and system include the documentation of the current status of the IT support of the enterprise business architecture, the so-called as-is IT support. For example, such documentation would specify that IT application Lotus Notes Version 4.1 supports, i.e. is used by, the organizational unit Business Unit Consumer Products when performing business process Market Campaign Management. The description of as-is IT support always refers to a concrete version of an IT application that is being used. Additional information may be supplied when describing such IT support (e.g., the start and end date of such support).

Implementations of the invention may include one or more of the following features: input forms using text, number and reference fields to document instances of such as-is IT support; interactive business support maps to visualize and document instances of such as-is IT support; interfaces to other computer-based information systems to retrieve information on the as-is IT support; software agents that scan the computer network of an enterprise for applications and that derive information used for the documentation of the as-is IT support from the results of such scans; description of the as-is IT support with respect to the organizational units, the business processes, and/or the products (i.e., products manufactured and sold by the enterprise) supported by the IT; qualification of an instance of such as-is IT support with respect to the time of validity; and refined description of an instance of such as-is IT support by detailing the individual services provided by an IT application and the consumption of such services by entities of the enterprise business architecture (i.e., organizational units, business processes, and products).

In another exemplary embodiment of the invention, the enterprise architecture planning method and system include the definition of the long-term target status of the IT support for the enterprise business architecture, the so-called target IT support. For example, such definition would specify that IT application mySAP PDM shall support (i.e., shall be used by) the organizational unit Business Unit Consumer Products when performing business process New Product Development. The description of target IT support does not refer to a concrete version of an IT application that is being used, but rather to an application, or even group of applications, in general.

A multitude of target IT support definitions may be given, partitioned into one or more independent IT strategies, each of which can be used to represent different time horizons (e.g., "Target for 2008," "Target for 2015," etc.). Within each of such IT strategies, a multitude of views on the target IT support can be defined by means of business support maps, thus structuring the presentation of the information. For example, a business support map labeled "Supply Chain Management" may be defined, where the axes of the matrix are chosen such that the maps shows all organizational units, business processes, and IT applications involved in supply chain management.

Implementations of the invention also may include one or more of the following features: input forms using text, number and reference fields to define instances of such target IT support; interactive business support maps to visualize and document instances of such target IT support; description of the target IT support with respect to the organizational units, the business processes, and/or the products (i.e., products manufactured and sold by the enterprise) supported by the IT; qualification of each instance of such target IT support with a status indicator to reflect whether this IT support is a draft proposal or approved; refined description of an instance of such target IT support by detailing the individual services provided by an IT application and the consumption of such services by entities of the enterprise business architecture, (i.e., organizational units, business processes, and products); definition of a multitude of independent IT strategies; definition of business support maps to constitute views on such target IT support and persistent storage of such definitions in the scope of IT strategies; and structuring of the business support map definitions within an IT strategy by means of folders.

In yet another exemplary embodiment of the invention, the enterprise architecture planning method and system include the operational planning, review, and plan consolidation of the IT support of the enterprise business architecture, the so-called to-be IT support. For example, such to-be IT support would specify that IT application Lotus Notes Version 4.3 shall support, (i.e., shall be used by) the organizational unit Business Unit Consumer Products when performing business process Market Campaign Management. The description of to-be IT support always refers to a concrete version of an IT application that is being used and always includes information on the planned start and end date of such support. Depending on the status of the planning process, specific to-be IT support instances may or may not be approved for implementation.

A multitude of approved to-be IT support definitions are combined into an IT master plan, which constitutes the context for consolidating and publishing such to-be IT support. Similarly to IT strategies, a multitude of views on the to-be IT support can be defined within an IT master plan by means of business support maps, thus structuring the presentation of the information. For example, a business support map "Supply Chain Management" may be defined, where the axes of the matrix are chosen such that the maps shows all organizational units, business processes, and IT applications involved in supply chain management.

The activity of planning to-be IT support is performed in the scope of architecture solutions. An architecture solution constitutes a context for planning an IT architecture—based on the as-is situation and existing, approved plans—that satisfies a given set of requirements. This includes planning of new or changes to existing IT support for entities of the enterprise business architecture (i.e., organizational units, business processes, and products). Such planned new or changed IT support constitutes the to-be business support.

In order to plan an architecture solution, a planner fetches information from the as-is IT support and from the existing approved to-be IT support, which is published in the IT master plan, from the central database of record and begins planning new or altered to-be IT support based on this information. Once the architecture solution is completed, it is reviewed by checking the newly planned to-be IT support for inherent inconsistencies, inconsistencies with other architecture solutions or the as-is IT support, inconsistencies with respect to the existing, published to-be support in the IT master plan, and by checking its compliance with respect to the applicable target IT support in the IT strategies. When approved, the newly planned to-be IT support is consolidated into the IT master plan and becomes public.

The system supports the planner in the generation of IT master plans and IT strategies by automatically assembling information that had previously been provided into the business support map defined by the user. To this end the system scans the central repository for all as-is, to-be, and target business supports that have an intersection with the organizational entities and business processes that determine the business support map. These as-is, to-be, or target business supports may have been defined on different business support maps or through other means by the same or any other of the users of the system.

Another aspect of system support is provided to the user in the ad-hoc generation of business support maps from the perspective of an individual application or a group of applications. Based on the as-is, to-be, and target business supports as defined for this application or group of applications the system determines an optimally fitting business support maps (i.e., organizational entities and business processes), and combines this with any other as-is, to-be, or target business support that exists in this context.

Implementations of the invention may include one or more of the following features: input forms using text, number and reference fields to define instances of such to-be IT support within architecture solutions and IT master plans; interactive business support maps to visualize and define instances of such to-be IT support within architecture solutions and IT master plans; automated copying of IT support information from IT master plans and IT strategies into architecture solutions to serve as planning basis; automated consistency checks across multiple architecture solutions, IT master plans, IT strategies and the as-is IT support; semi-automated resolution of conflicts identified across multiple architecture solutions, IT master plans, and IT strategies; automated merging of IT support information from architecture solutions into IT master plans; description of the to-be IT support with respect to the organizational units, the business processes, and/or the products (i.e., products manufactured and sold by the enterprise) supported by the IT; qualification of each instance of such to-be IT support with a status indicator to reflect whether this IT support is a draft proposal or approved; refined description of an instance of such to-be IT support by detailing the individual services provided by an IT application and the consumption of such services by entities of the enterprise business architecture (i.e., organizational units, business processes, and products); refined description of an instance of such to-be IT support by defining a multitude of lifecycle status to describe various phases of IT support (e.g., "Test", "In Production", "Phase Out"); definition of a multitude of independent IT master plans; definition of business support maps to constitute views on such to-be IT support and persistent storage of such definitions in the scope of IT master plans; and structuring of the business support map definitions within an IT master plan by means of folders.

In a general aspect, an enterprise architecture planning system includes a computer system, hosting an enterprise architecture database, a set of enterprise architecture planning services, and a portal accessible via a network. A multitude of clients can access the enterprise architecture planning system via the network.

BRIEF DESCRIPTION OF THE DRAWINGS

Figure 1:
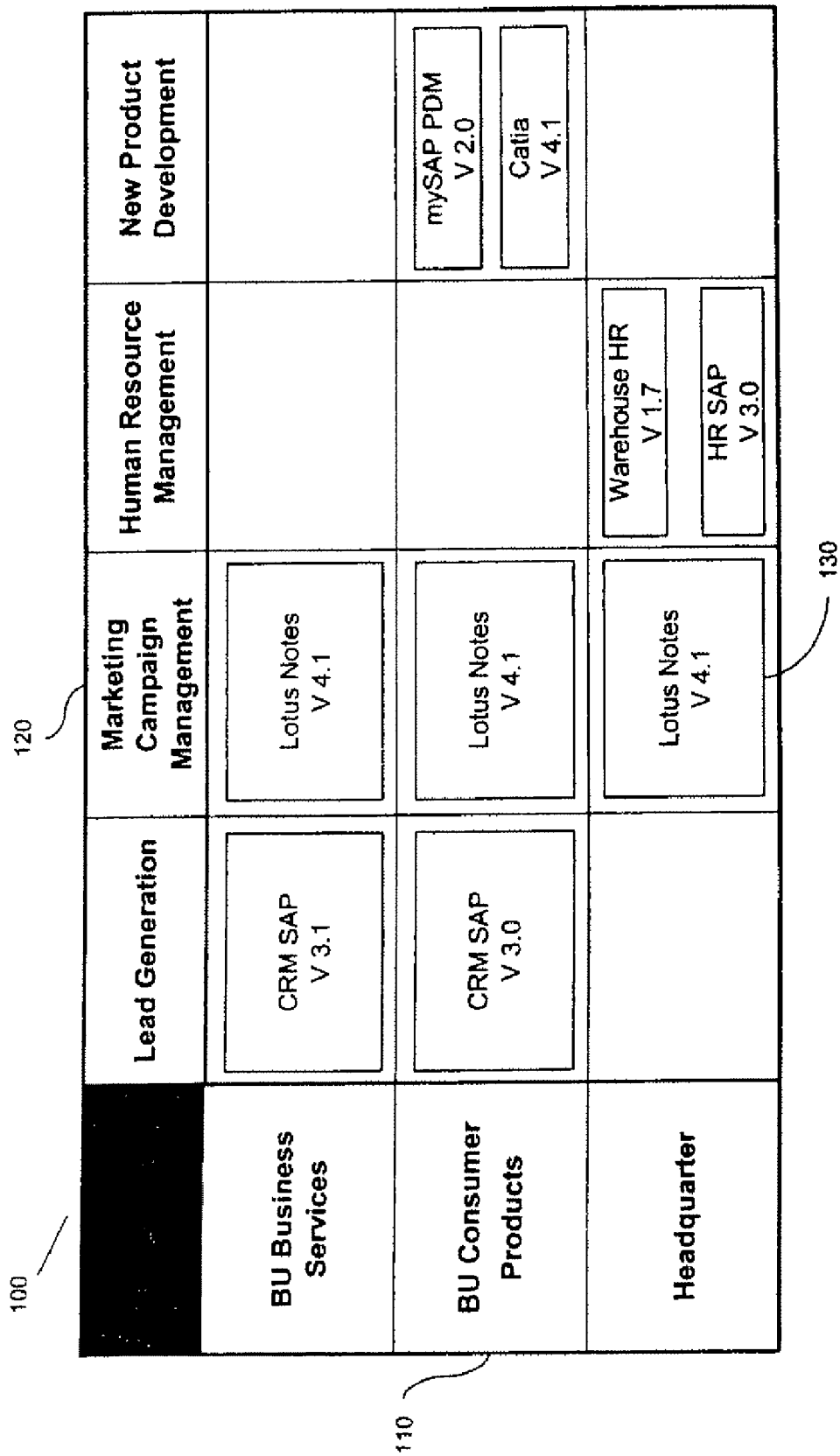

Having thus described the invention in general terms, reference will now be made to the accompanying drawings, which are not necessarily drawn to scale, and wherein:

FIG. 1 is an example of a business support map that visualizes IT support for organizational units in performing business processes, according to the prior art.

Figure 2:
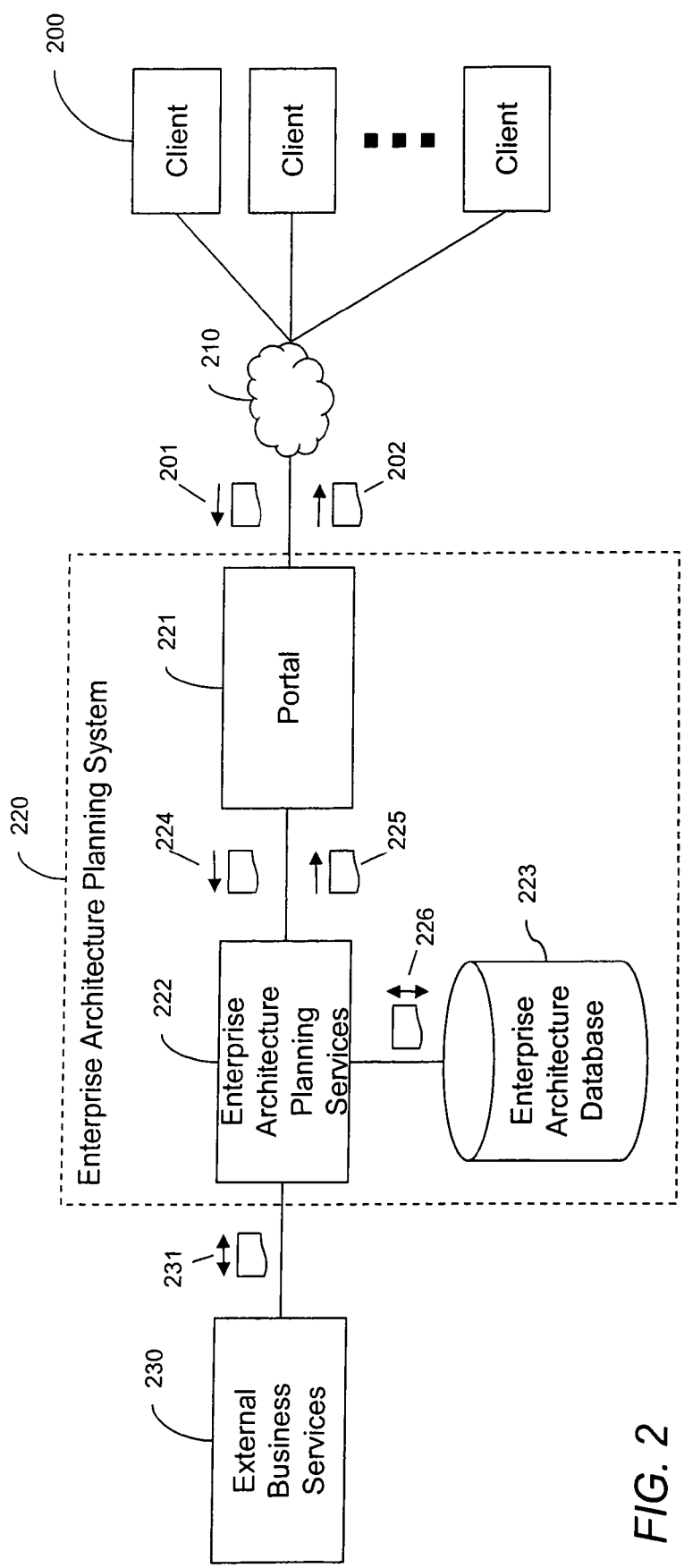

FIG. 2 is a block diagram illustrating the integrated enterprise architecture planning system, in accordance with an exemplary embodiment of the present invention.

Figure 3:
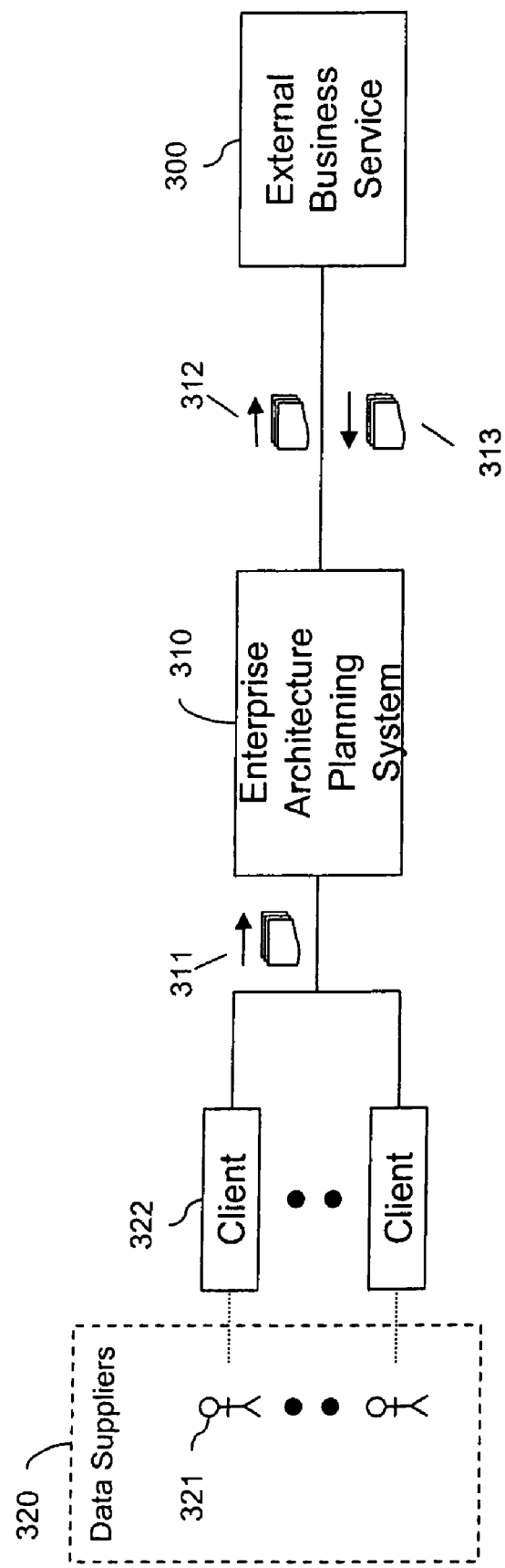

FIG. 3 is a block diagram illustrating the interaction of data suppliers with the integrated enterprise architecture planning system, in accordance with an exemplary embodiment of the present invention.

Figure 4:
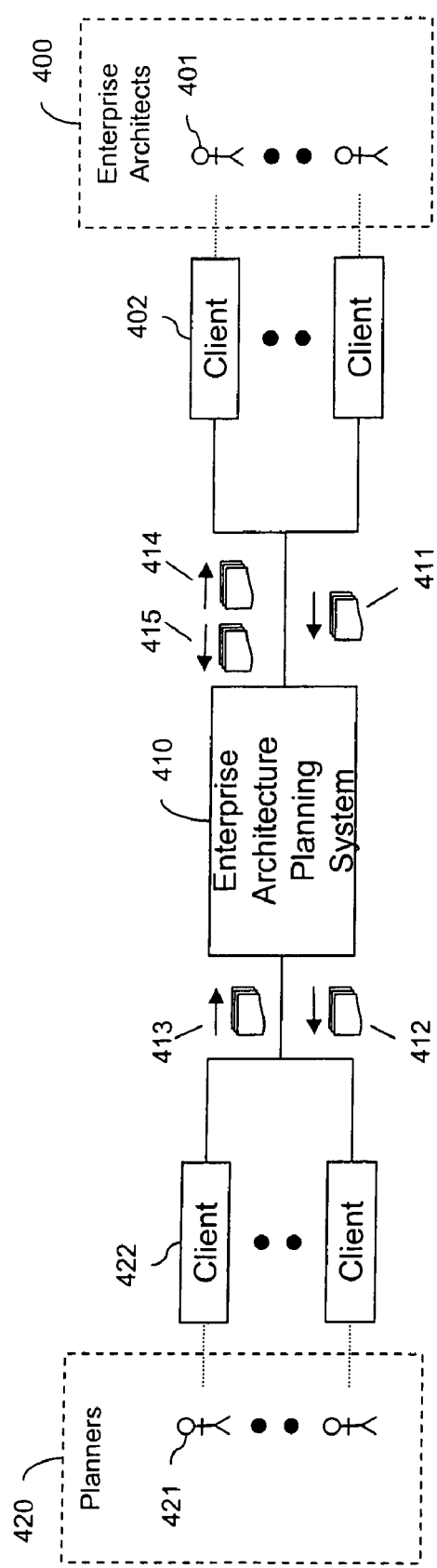

FIG. 4 is a block diagram illustrating the interaction of planners and enterprise architects with the integrated enterprise architecture planning system, in accordance with an exemplary embodiment of the present invention.

Figure 5:
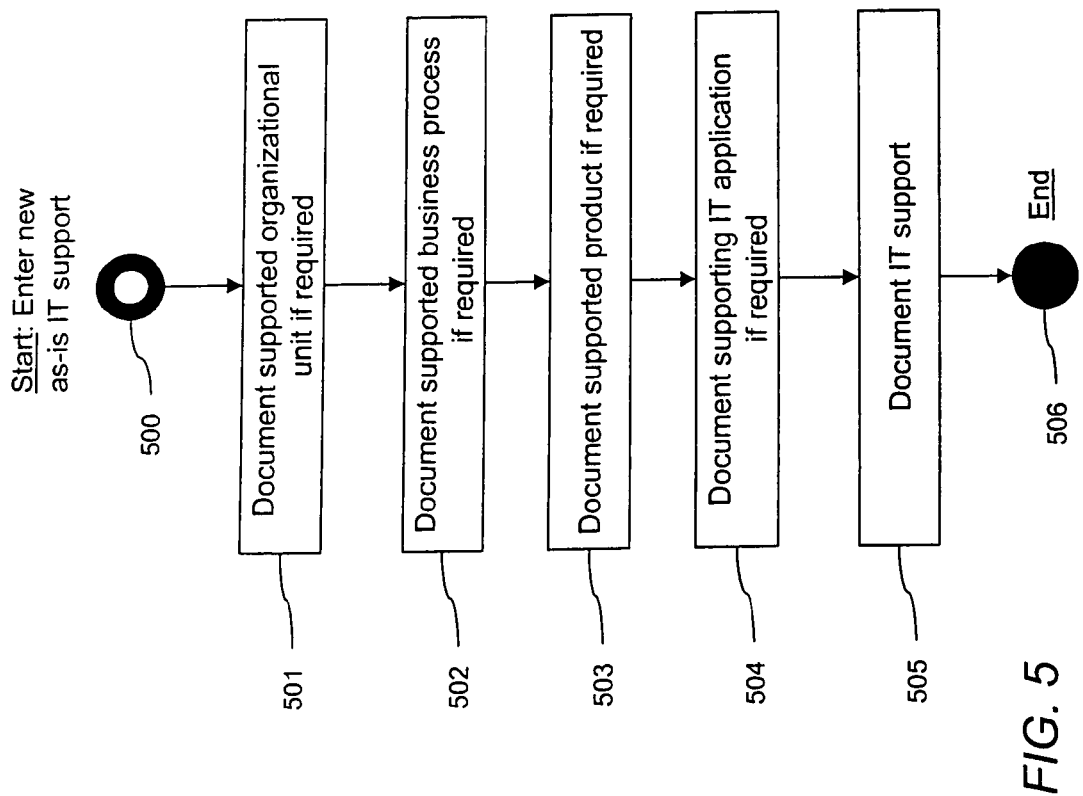

FIG. 5 is a flow diagram showing the sequence of actions to document as-is IT support within the enterprise architecture planning system, in accordance with an exemplary embodiment of the present invention.

Figure 6:
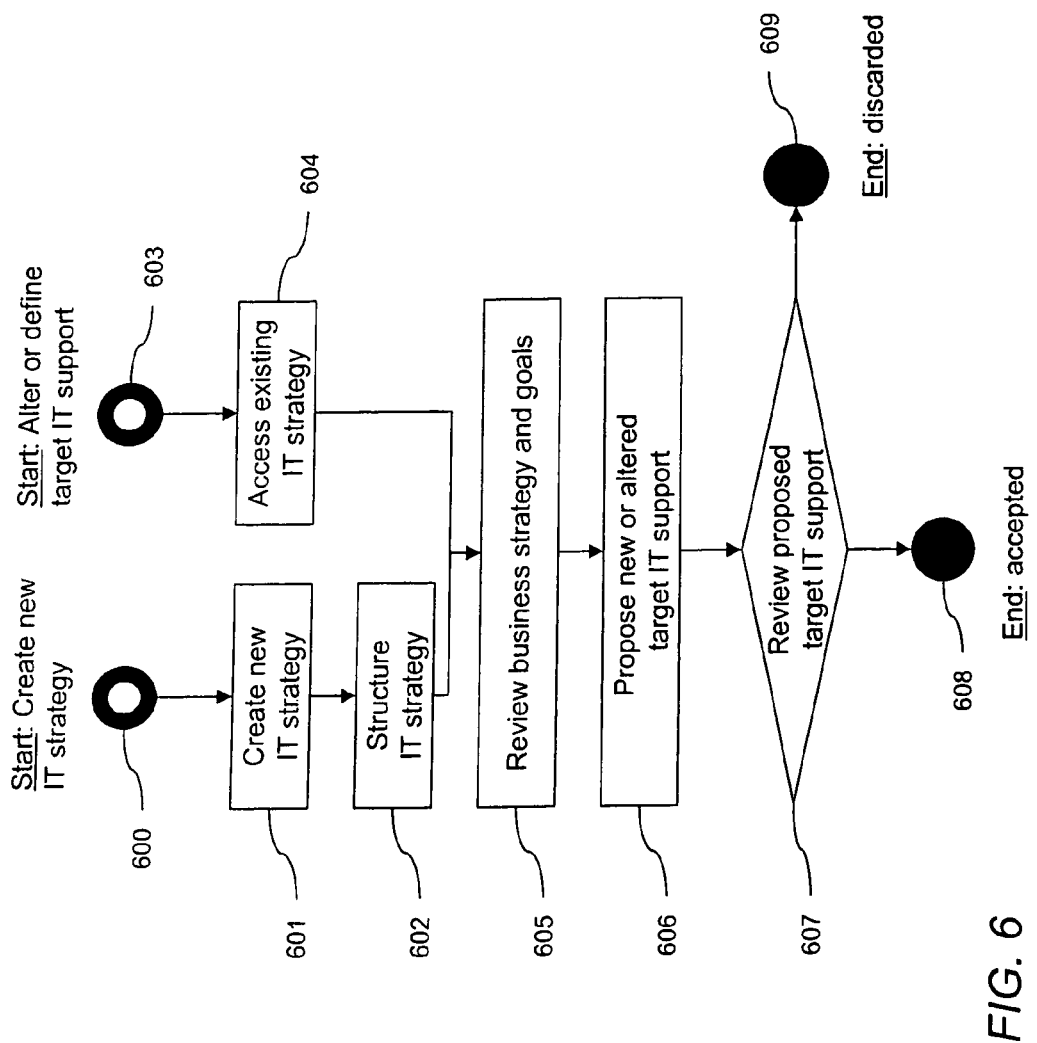

FIG. 6 is a flow diagram showing the sequence of actions to define and maintain IT strategies within the enterprise architecture planning system, in accordance with an exemplary embodiment of the present invention.

Figure 7:
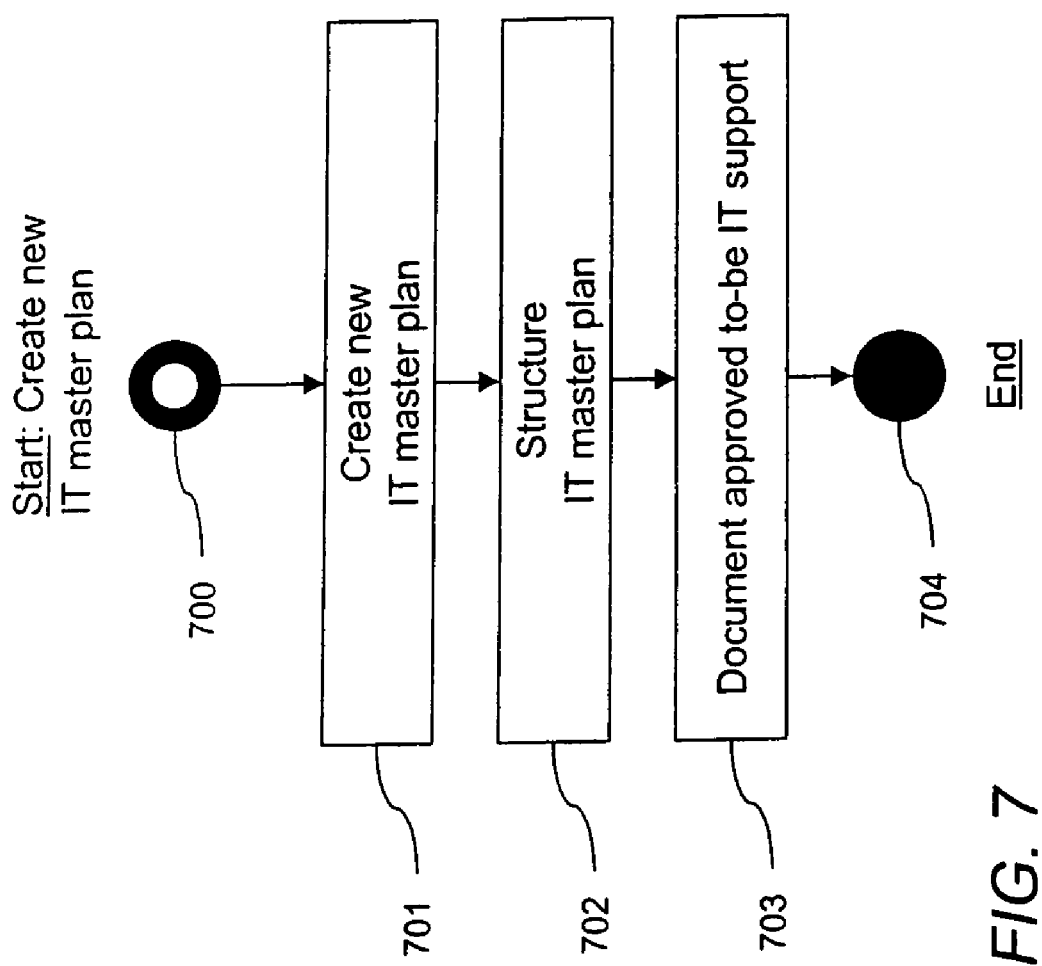

FIG. 7 is a flow diagram showing the sequence of actions to create IT master plans within the enterprise architecture planning system, in accordance with an exemplary embodiment of the present invention.

Figure 8:
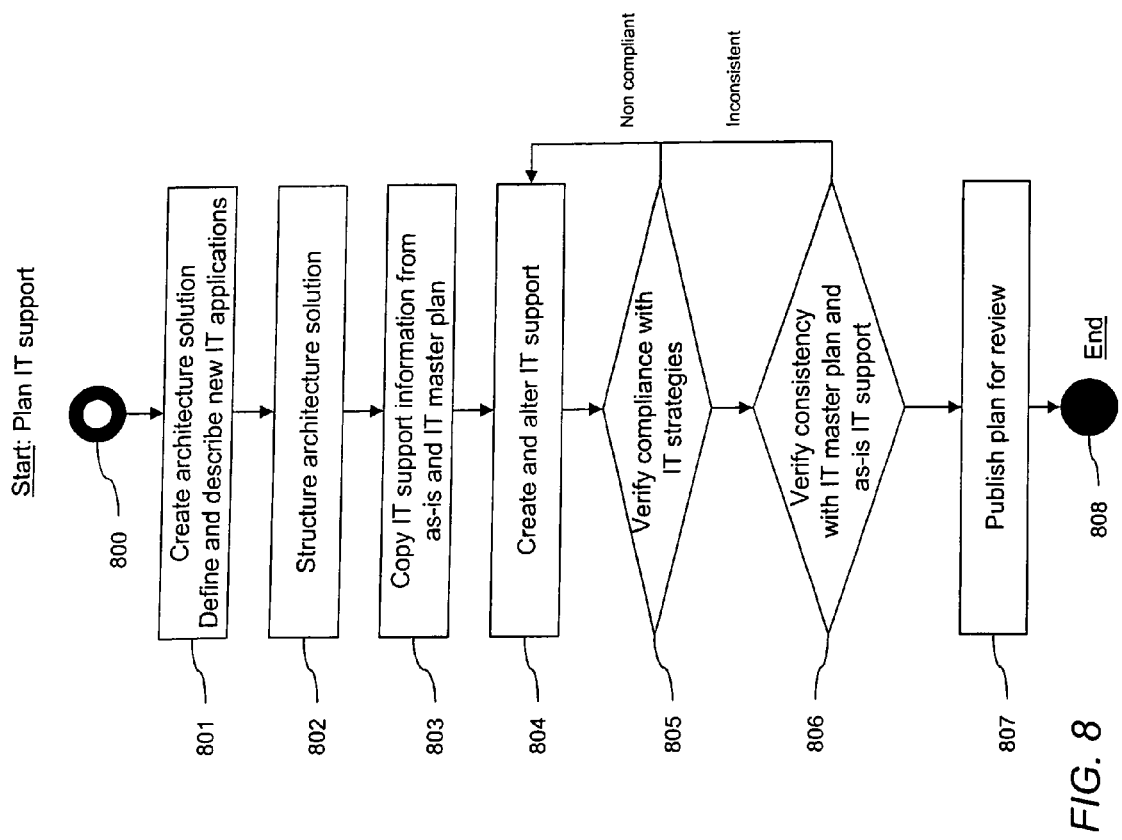

FIG. 8 is a flow diagram showing the sequence of actions to create and plan architecture solutions within the enterprise architecture planning system, in accordance with an exemplary embodiment of the present invention.

Figure 9:
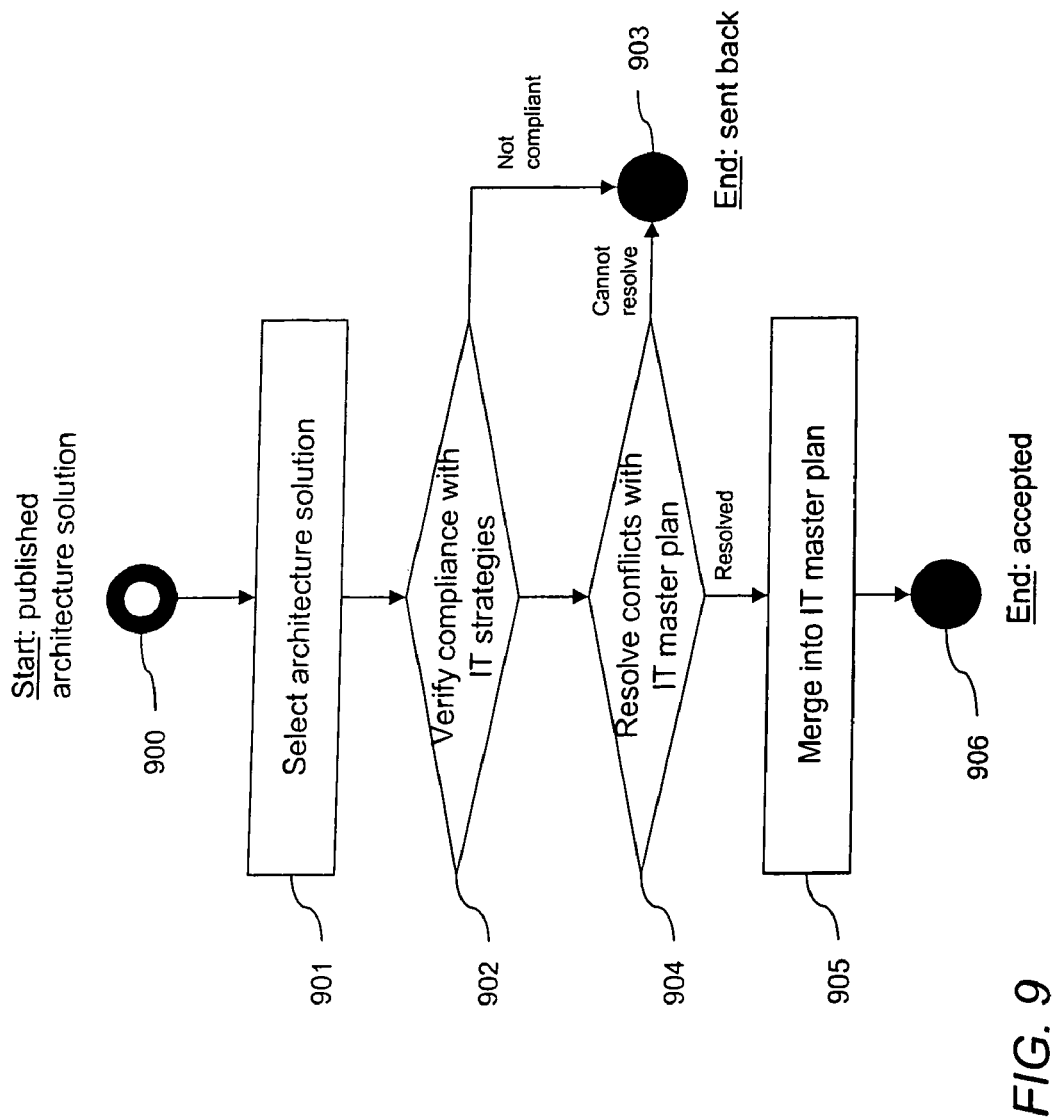

FIG. 9 is a flow diagram showing the sequence of actions to review and consolidate architecture solutions within the enterprise architecture planning system, in accordance with an exemplary embodiment of the present invention.

Figure 10:
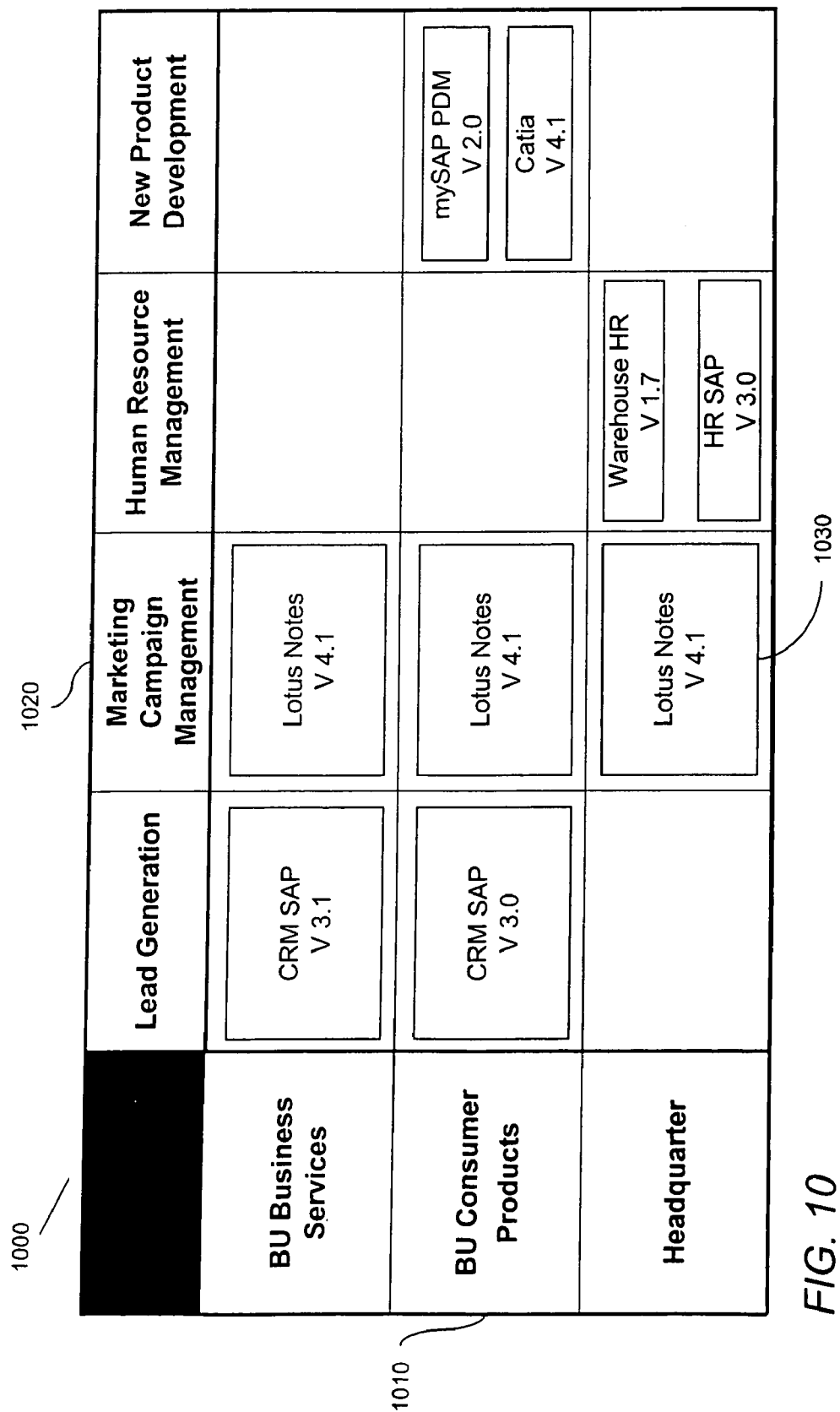

FIG. 10 is a representation of the definition of a business support map by defining the organizational entities and business processes involved and the as-is, to-be, and target business supports automatically populated by the system, in accordance with an exemplary embodiment of the present invention.

Figure 11:
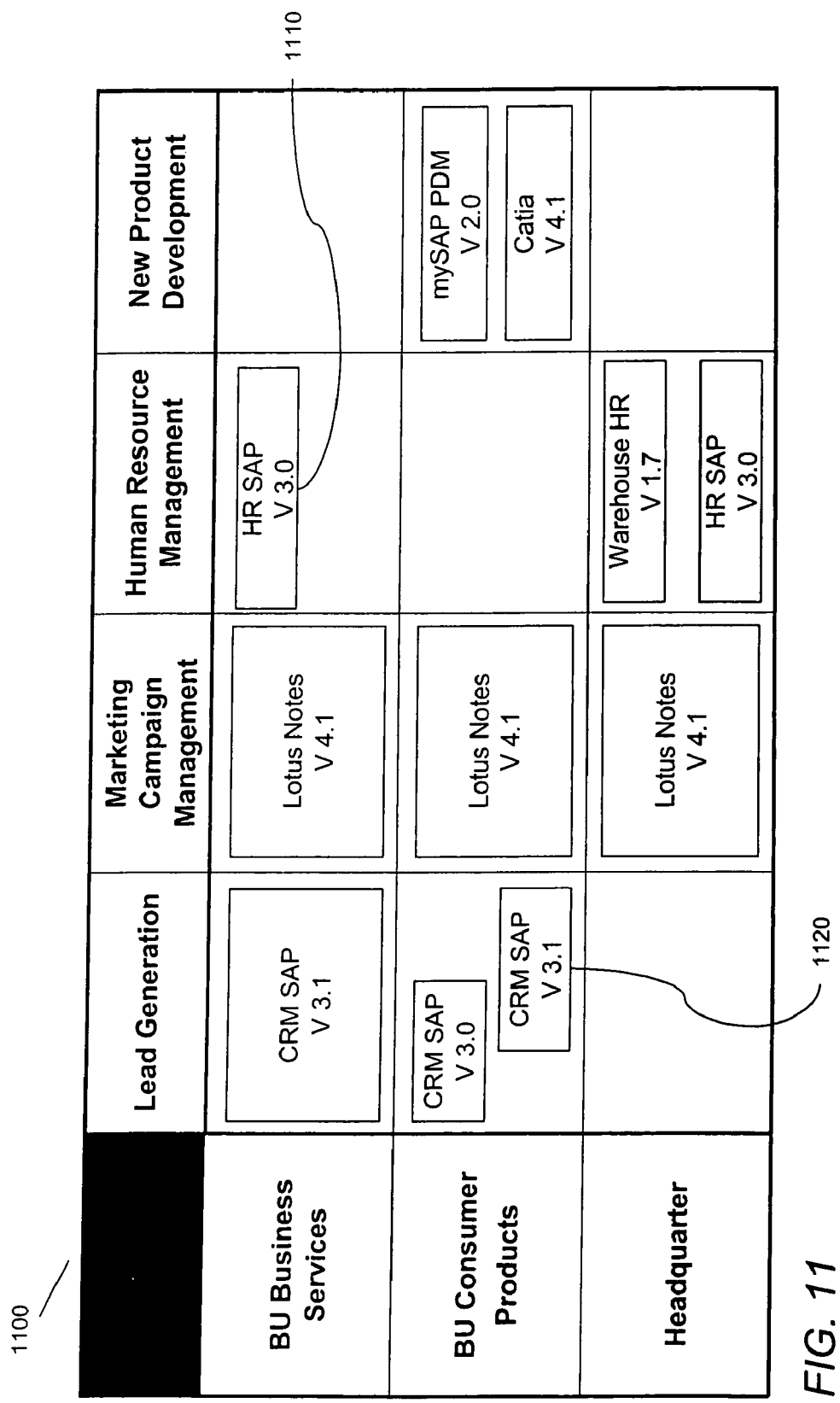

FIG. 11 is a representation of the business support map from FIG. 10 with some of the business supports being extended or modified through a simple graphical interaction, in accordance with an exemplary embodiment of the present invention.

Figure 12:
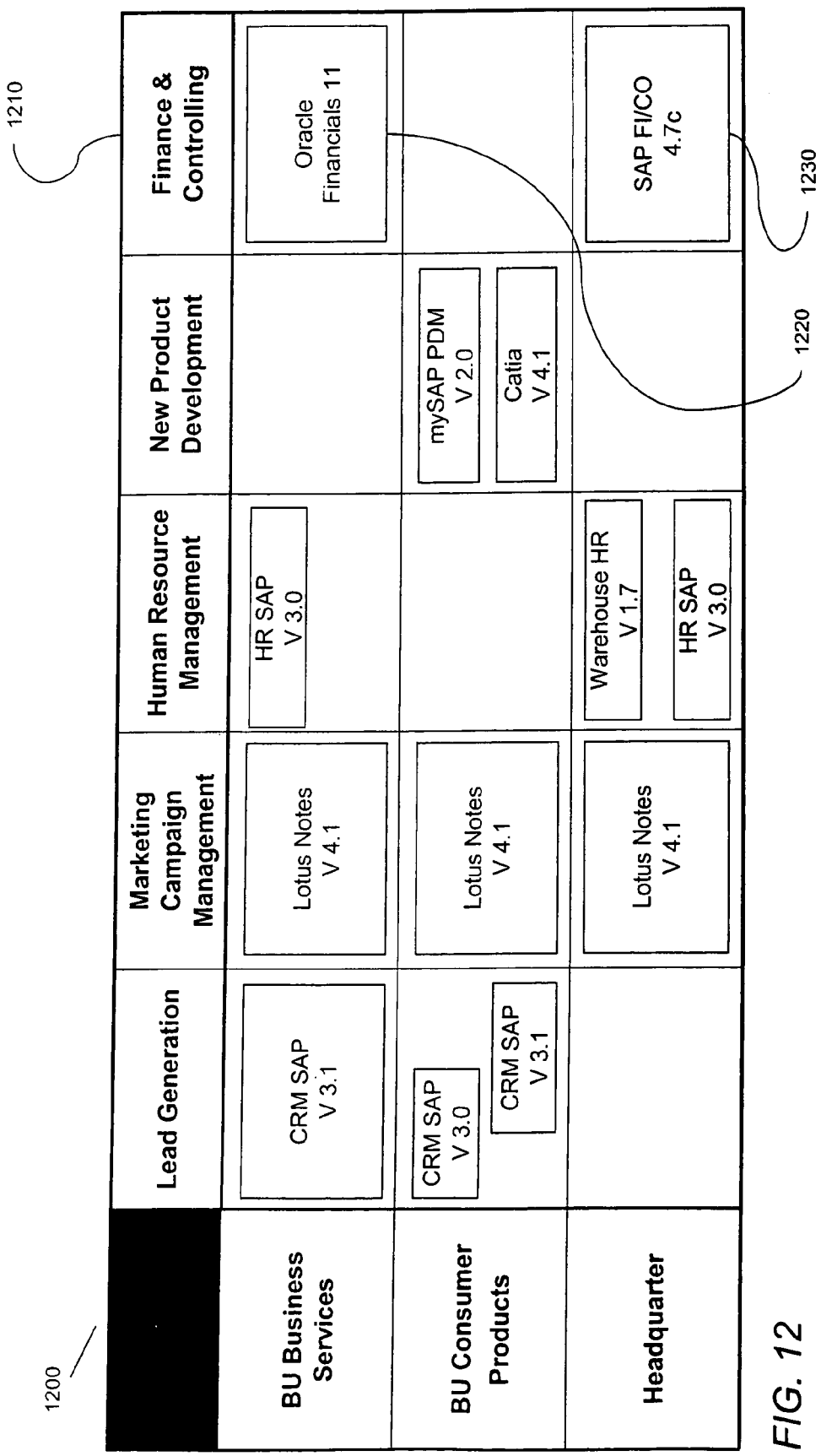

FIG. 12 is a representation of the business support map from FIG. 11 with an extension of the business process dimension resulting in an automated update of the business supports displayed, in accordance with an exemplary embodiment of the present invention.

Figure 13:
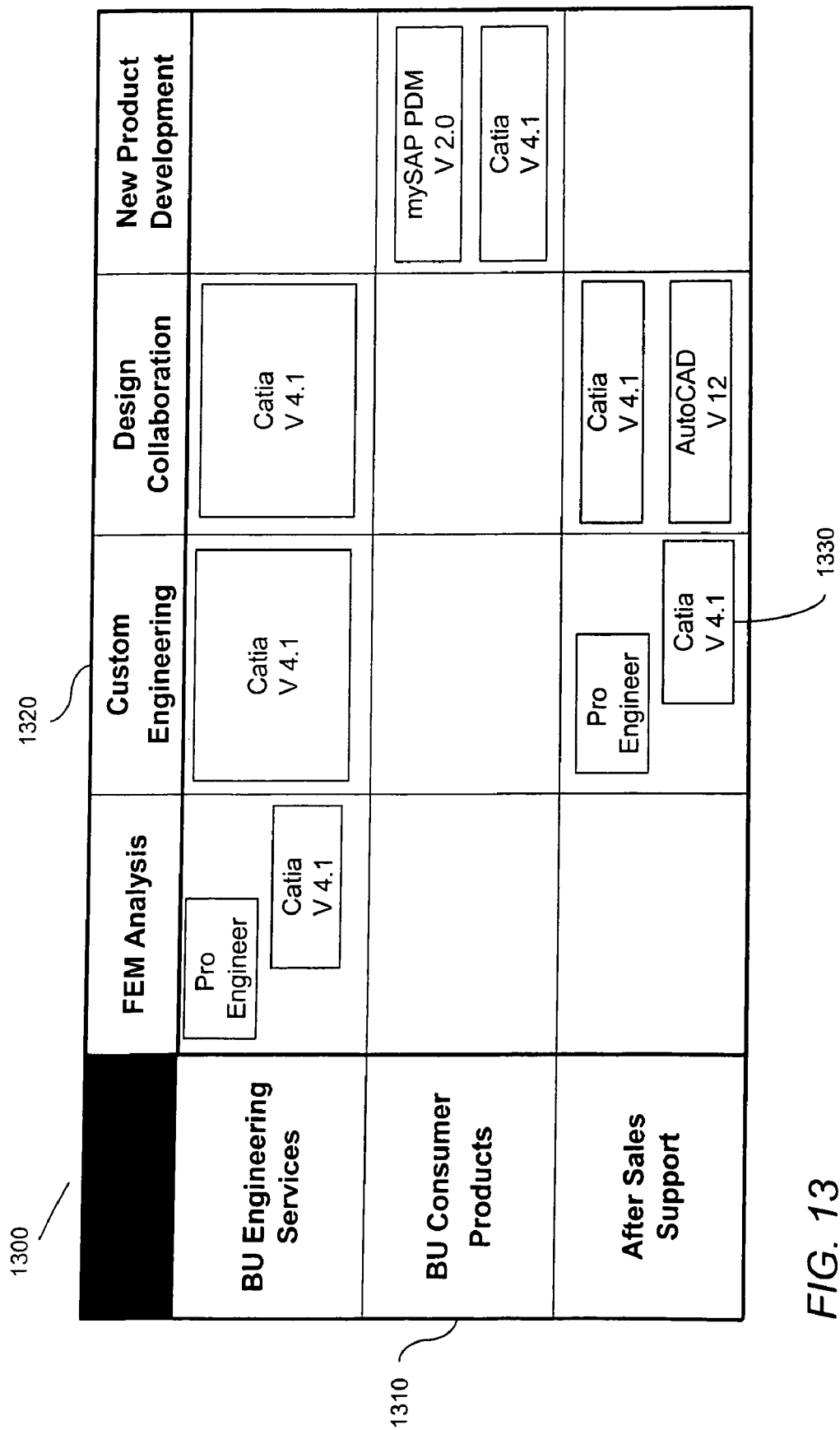

FIG. 13 is a representation of the business support map automatically generated by the system for the application Catia V4.1, in accordance with an exemplary embodiment of the present invention.

DETAILED DESCRIPTION OF THE INVENTION

It is the object of the invention to provide a system and a method for managing enterprise IT support as an integrated solution for facilitating enterprise architecture planning in context of and derived from the business strategy of the enterprise.

The present invention will be described below with reference to the accompanying drawings, in which exemplary embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The present invention is described below with reference to block diagrams of systems, methods, apparatuses and computer program products according to an embodiment of the invention. It will be understood that each block of the block diagrams, and combinations of blocks in the block diagrams, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functionality of each block of the block diagrams, or combinations of blocks in the block diagrams discussed in detail in the descriptions below.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the block or blocks.

Accordingly, blocks of the block diagrams support combinations of means for performing the specified functions, combinations of steps for performing the specified functions and program instruction means for performing the specified functions. It will also be understood that each block of the block diagrams, and combinations of blocks in the block diagrams, can be implemented by special purpose hardware-based computer systems that perform the specified functions or steps, or combinations of special purpose hardware and computer instructions.

The inventions may be implemented through an application program running on an operating system of a computer. The inventions also may be practiced with other computer system configurations, including hand-held devices, multi-processor systems, microprocessor based or programmable consumer electronics, mini-computers, mainframe computers, etc.

Application programs that are components of the invention may include routines, programs, components, data structures, etc. that implement certain abstract data types, perform certain tasks, actions, or tasks. In a distributed computing environment, the application program (in whole or in part) may be located in local memory, or in other storage. In addition, or in the alternative, the application program (in whole or in part) may be located in remote memory or in storage to allow for the practice of the inventions where tasks are performed by remote processing devices linked through a communications network. Exemplary embodiments of the present invention will hereinafter be described with reference to the figures, in which like numerals indicate like elements throughout the several drawings.

FIG. 1 shows an example of a business support map. The business support map 100 has the form of a matrix, with a header column 110 that shows the name of an organizational unit in each row of the header column 110, and a header row 120 that shows the name of a business process in each column of the header row 120. Within the matrix, elements 130, which represent IT applications, are placed in cells to visualize the IT support that such IT applications provide to the respective organizational unit corresponding to the row that the cell is placed in, in performing the respective business process corresponding to the column that the cell is placed in. In FIG. 1, for example, the cell labeled Catia V 4.1 in the right-most column represents IT support of application "Catia", version 4.1 for the organizational unit Business Unit Consumer Products in performing the business process New Product Development. In an exemplary embodiment the matrix elements 130 are active to provide linkage to detailed information on the IT applications and the services they render.

Various alternative forms of business process maps can be defined, for example by transposing columns and rows, by showing products produced and/or sold by an enterprise instead of organizational units on either column or row headers, or by superimposing the aspect of transition of such IT support in time.

FIG. 2 is a block diagram that illustrates an exemplary enterprise architecture planning system 220 in accordance with the invention. System 220 comprises a portal 221, a set of enterprise architecture planning services 222, and an enterprise architecture database 223, each of which is hosted on and executed by a data processing system, which is preferably realized by one or multiple connected microcomputers, such as an ensemble of network servers.

The portal 221 provides a common interface to the enterprise architecture planning system 220, to which a multitude of clients 200 can be connected over a network 210. The network 210 can be a local area network (LAN), wide area network (WAN), enterprise network, virtual private network (VPN), the Internet, and the like. The clients 200 are preferably realized by microcomputers, such as personal computers each having a monitor for displaying computer screens and a keyboard or other device for providing input. Clients 200 send requests 201 to the portal 221, which send data views 202, such as web pages, in response. The portal 221 communicates with the set of enterprise architecture planning services 222 by sending request data 224 to the enterprise architecture planning services 222 and receives response data 225 in order to fulfill the requests from clients 200. The set of enterprise architecture planning services 222 communicates with an enterprise architecture database 223, storing and retrieving data 226 in, respectively, from the enterprise architecture database 223. The data stored in such enterprise architecture database 223 includes IT applications and their specific versions, as well as information on the enterprise business architecture, covering the organizational structure of the enterprise, its business processes, and its products.

The set of enterprise architecture planning services 222 may or may not be connected to external business services 230 to submit or retrieve various types of data 231. The external business services 230 can include various application services, such as user directory and authentication systems, or systems providing information on the "as-is" status of IT applications and the IT support they provide, such as Configuration Management Databases (CMDB). The enterprise architecture planning system 220 can integrate and interact with the data and functionality of such external business services 230.

FIG. 3 is a block diagram that illustrates the interaction of the community of data suppliers 320 and external business services 300 with the enterprise architecture planning system 310 for the purpose of documenting the as-is situation of IT support for entities of the enterprise business architecture (i.e., organizational units, business processes, and products). A user 321 from the community of data suppliers 320 makes use of a client 322 to connect to and interact with the enterprise architecture planning system 310. Using the client 322, a user 321 submits a multitude of data items 311 describing the as-is IT support to the enterprise architecture planning system 310. Such submission of data items by the community of data suppliers 320 is performed following the sequence of actions illustrated in FIG. 5.

Optionally, the as-is information on IT support may be obtained from external business services 300. In this scenario, the enterprise planning system 310 sends a multitude of queries 312 to the external business services 300, which reply with data items 313 that provide the requested information on as-is IT support. Alternatively, a set of external business services 300 may supply information 313 on as-is IT support without a corresponding request 312, thus "pushing" information into the enterprise architecture planning system 300.

FIG. 4 is a block diagram that illustrates the interaction of the communities of planners 420 and enterprise architects 400 with the enterprise architecture planning system 410. A user 401 from the community of enterprise architects 400 makes use of a client 402 to connect to and interact with the enterprise architecture planning system 410. Using the client 402, a user 401 submits a multitude of data items 411 to the enterprise architecture planning system 410, so as to define and maintain the target IT support in the scope of IT strategies, and to define and maintain the to-be IT support in the scope of IT master plans. Such interaction with the community of enterprise architects 400 is performed following the sequences of action illustrated in FIG. 6 and FIG. 7, describing the processes of managing IT strategies and IT master plans, respectively.

A user 421 from the community of planners 420 makes use of a client 422 to connect to and interact with the enterprise architecture planning system 410. Using the client 402, the user 401 retrieves data 412 from the enterprise architecture planning system 410, including information on the as-is IT support, on the to-be IT support documented in IT master plans, and on the target IT support documented in IT strategies. Based on this information, the user 421 creates a new plan for to-be IT support and submits data 413 to the enterprise architecture planning system 410, documenting such plan and publishing it for review. This interaction between the community of planners 420 and the enterprise architecture planning system 410 is performed following the sequence of actions illustrated in FIG. 8.

The enterprise architecture planning system 410 makes plans, which have been submitted and published by the community of planners 420, accessible for review to the community of enterprise architects 400. An enterprise architect 401 from this community makes use of a client 402 to connect to and interact with the enterprise architecture planning system 410 to retrieve information 414 on such plans, also retrieving information on IT strategies, IT master plans, and other proposed plans that are affected by the plan to be reviewed. Based on this information, the enterprise architect 401 performs the review, identifying and rectifying inconsistencies with respect to other plans taking advantage of the various-consistency checks provided by the enterprise architecture planning system 410. Finally, the enterprise architect 401 either rejects the plan and passes it back to the respective planner 421 for update, or the plan is consolidated with and merged into the IT master plan, thus becoming part of the accepted and published to-be plan for future IT support; the result 415 of such operation is submitted to the enterprise architecture planning system 410. This interaction between the community of enterprise architects 400 and the enterprise architecture planning system 410 is performed following the sequence of actions illustrated in FIG. 9.

FIG. 5 is a flow diagram that shows the sequence of actions that users from the community of data suppliers perform to document the as-is IT support within the enterprise architecture planning system. Users may perform such action in response to a policy established within the user community, an assignment sent by another member of the user community or an alert generated by the system in context of a data analysis or validation process.

The sequence starts at step 500 when a user who wants to document as-is IT support instances invokes an appropriate command in the user interface of the enterprise architecture planning system, for example by selecting a menu item "document as-is IT support", and subsequently performs steps 501-504 to identify the supported organizational unit (step 501), business process (step 502), product (step 503), and the supporting IT application (step 504), as required by the specific IT support to be documented. If the user finds during any of these steps that the respective entity has not been documented within the enterprise architecture planning system yet, the corresponding entities are documented in the respective steps. For example, a user may want to record IT support provided by an IT application that has not been documented in the enterprise architecture planning system, such that the respective IT application would be documented in step 504. Documentation of new entities may or may not require specific permissions to be granted to the user performing such task.

Finally, the as-is IT support is documented in step 505 as a relation between a supporting IT application and a supported organizational unit, business process, and/or product. Whether an IT application is understood as supporting an organizational unit performing a business process, an organizational unit providing a product, or a business process being performed for a product depends largely on the documentation conventions applied by the user community. After this step, the sequence ends at step 506.

FIG. 6 is a flow diagram that shows -the sequence of actions that users from the community of enterprise architects perform to create and maintain IT strategies within the enterprise architecture planning system in order to define and manage the target IT support. Users may perform such action in response to a policy established within the user community (e.g., a quarterly plan review), an assignment sent by another member of the user community or an alert generated by the system in context of a data analysis or validation process.

The sequence starts at step 600 when an enterprise architect needs to create a new IT strategy, for example to reflect the target IT support for an organization that has previously not been considered. The enterprise architect invokes step 601 to use an appropriate command in the user interface of the enterprise architecture planning system to create a new IT strategy and subsequently provides information on such new IT strategy, for example including a name, description and access permissions.

Subsequently, the user proceeds to step 602, where the user invokes appropriate commands in the user interface of the enterprise architecture planning system to structure the new IT strategy, which includes the definition of business support maps and organization of such business support maps in a folder structure to aid navigation. Definition of business support maps implies only the definition of their axes, for example of the organizational units and business processes to be shown; it is not concerned with the content of the map, i.e., the cells of the matrix, which constitute the target IT support that will be defined later in the process.

Alternatively, the sequence may start at step 603 and when a user who wants to change existing or introduce new target IT support, step 604 is invoked to select the IT strategy in the scope of which to perform the action by means of navigating IT strategies that are stored in the system, e.g., by navigating a list of IT strategies, selecting the appropriate IT strategy and performing an "edit" action on it.

In both cases, after the IT strategy and its structure have been specified or selected, the user proceeds to step 605 and reviews the business strategies and goals of the enterprise to derive long-term requirements on the IT. Such business strategies and goals may or may not be stored in the enterprise architecture planning system; consequently, the system may or may not be able to provide assistance in performing this step.

Subsequently, the user invokes step 606 to document new or altered target IT support as a proposal in the enterprise architecture planning system, aimed to satisfy the requirements and needs identified in the previous step. Input ef such-new or altered target IT support may be either performed by filling in respective forms, or graphically by editing one or more of the business support maps prepared in step 602. In both cases, any changes to the target IT support are immediately reflected in all presentations of the respective business support maps, as the enterprise architecture planning system draws such maps on demand dynamically from its database of record.

Based on the proposed target IT support defined in the previous step, one or more enterprise architects, possibly on behalf of a review board, proceed to step 607 to inspect and review the proposed target IT support and decide to accept or discard it. If it is accepted, the respective target IT support is marked as approved and the sequence ends at step 608; if it is discarded, the proposed IT support is marked accordingly and the sequence ends at step 609.

FIG. 7 is a flow diagram that shows the sequence of actions that users from the community of enterprise architects perform to define IT master plans within the enterprise architecture planning system. Users typically perform such action in response to a policy established within the user community.

The sequence starts at step 700 when an enterprise architect needs to create a new IT master plan, usually the first and only such IT master plan present in the enterprise architecture planning system. The enterprise architect proceeds to step 701 invoking an appropriate command in the user interface of the enterprise architecture planning system to create a new IT master plan and subsequently provides information on such new IT master plan, for example including a name, description and access permissions.

Subsequently, the user proceeds to step 702, where the user invokes appropriate command in the user interface of the enterprise architecture planning system to structure the new IT master plan, which includes the definition of business support maps and organization of such business support maps in a folder structure to aid navigation. The definition of business support maps implies only the definition of their axes, for example the organizational units and business processes to be shown; it is not concerned with the content of the map (i.e., the cells of the matrix), which constitute the to-be IT support that will be defined later in the process. The preferred embodiment stipulates the definition of IT applications that are permissible or preferable in any of the IT supports definable on the respective business support map.

Finally, the user proceeds to step 703 and documents all existing, i.e. already approved, to-be IT supports that are relevant to the new IT master plan. Input of such approved to-be IT support may either be performed by filling in respective forms, or graphically by editing one or more of the business support maps prepared in step 702. In both cases, any changes to the to-be IT support are immediately reflected in all presentations of the respective business support maps, as the enterprise architecture planning system draws such maps on demand dynamically from its database of record. New, i.e., not yet approved, to-be IT support will be created within architecture solutions (FIG. 8), and will be approved and merged into the IT master plan in a separate process (FIG. 9). After this step, the sequence ends at step 704.

FIG. 8 is a flow diagram that shows the sequence of actions that users from the community of planners perform to plan new IT support within the enterprise architecture planning system. Users may perform such action in response to a policy established within the user community or an assignment sent by another member of the user community.

The sequence starts at step 800 when a user from the community of planners needs to create a new plan for IT support, usually in response to a request for delivering new or changed IT services to the enterprise. This request may or may not be stored in the enterprise architecture planning system and therefore delivery of such request to the planner may be performed by the enterprise architecture planning system or not.

In step 801, the user creates a new architecture solution by invoking an appropriate command in the user interface of the enterprise architecture planning system; upon creation of an architecture solution, a number of information may be provided by the user, e.g. a documentation of the scope and purpose of the plan and a specification of access permissions. Typically, the user will also define and describe the new IT applications (and potentially interfaces) that are required for the new architecture solution.

Subsequently, the user proceeds to step 802 to structure the architecture solution, which includes the definition of business support maps and optionally the organization of such business support maps in a folder structure to aid navigation. Definition of business support maps implies only the definition of their axes, for example the organizational units and business processes to be shown; it is not concerned with the content of the map (i.e., the cells of the matrix), which constitute the newly planned to-be IT support that will be defined later in the process.

Next in step 803, the user copies relevant information about the current as-is IT support and about the approved to-be IT support, as documented in the IT master plan, into the scope of the architecture solution. Thus, the user can modify the locally copied IT support information within the architecture solution without impacting the public information on the as-is and approved to-be IT support. Identification of which IT support information is relevant for copying into the architecture solution is accomplished by the enterprise architecture planning system by inspecting the business support maps defined in step 802 (any IT support that is displayed in such maps qualifies for a local copy).

Based on the local copies, the user invokes step 804 to perform planning activities by creating new or altering existing IT support items. Input of such new or altered to-be IT support may either be performed by filling in respective forms, or graphically by editing one or more of the business support maps prepared in step 802. In both cases, any changes to the to-be IT support are immediately reflected in all presentations of the respective business support maps, as the enterprise architecture planning system draws such maps on demand dynamically from its database of record.

Once the user has composed a satisfactory set of IT support to meet the requirements for the architecture solution, step 805 is invoked to verify the compliance of the planned set of IT support with the IT strategies. To accomplish this, the user obtains respective reports from the enterprise architecture planning system. For example, such reports would identify that the architecture solution suggests using application Lotus Notes 4.1 for performing the business process Marketing Campaign Management in the organizational unit Business Unit Consumer Products, but the IT strategy establishes the use of application mySAP CRM for such process and such organizational unit. If non-compliant elements of the plan are identified in this step, the user may or may not decide to alter the plan by going back to step 804.

After compliance with IT strategies has been assessed, the user proceeds to step 806 to verify consistency with the current IT master plan and the as-is IT support; this is required, because cause the planning process including steps 804 and 805 may last over several days or weeks, and the IT master plan as well as the as-is IT support may have changed in the meantime, rendering the planning basis established in step 803 out of date. If any inconsistent elements of the plan are identified in this step, the user may or may not decide to alter the plan by going back to step 804.

Once all consistency and compliance checks have been performed satisfactorily, the content of the plan is published and submitted for review by enterprise architects in step 807 as detailed in the sequence of action described in FIG. 9. With this action, the sequence ends at step 808.

FIG. 9 is a flow diagram that shows the sequence of actions that users from the community of enterprise architects perform to reviewing architecture solutions created by the community of planners. Users may perform such action in response to a policy established within the user community, an assignment sent by another member of the user community or an alert generated by the system in context of a data analysis or validation process.

The sequence starts at step 900 when one or more architecture solutions become available for review as a result of the sequence of actions described in FIG. 8. A user from the community of enterprise architects invokes step 901 to select one of such architecture solutions for review, for example by selecting an entry from a list of architecture solutions open for review.

Once an architecture solution is selected, step 902 is invoked to verify the compliance of the planned set of IT support within the architecture solution with the IT strategies; this step is identical to step 805, but is performed by the reviewing enterprise architect, not by the planner who is creating an architecture solution. To accomplish the compliance check, the user obtains respective reports from the enterprise architecture planning system. If non-compliant elements of the plan are identified in this step, the enterprise architect may stop the process at step 903 and send the architecture solution back to the responsible planner for modification.

After compliance with IT strategies has been assessed, step 904 is invoked, where the user verifies consistency with the current IT master plan and the as-is IT support, and attempts to resolve any conflicts that are found by altering the architecture solution accordingly. If inconsistent elements are identified in the architecture solution that cannot be resolved, the process is stopped at step 903 and the architecture solution is sent back to the responsible planner for modification.

Finally, after the architecture solution has been reconciled with the IT strategies and the IT master plan, all of its new or altered IT support items are merged into the IT master plan at step 905. Thus, the IT support proposed by the architecture solution becomes approved and public to-be IT support, consequently becoming the basis for further architecture solution planning, as it will be used as input in step 803. After the architecture solution has been merged into the IT master plan, the sequence ends at step 906.

The process detailed in FIG. 9 concentrates on the procedures involved in reviewing, assessing, and merging plans for IT support as defined in the scope of architecture solutions; the process is not concerned with the review and approval of the business proposition associated with any such architecture solutions, which is a separate process that may or may not be covered by the enterprise architecture planning system.

FIG. 10 is a representation of a business support map definition. The business support map 1000 is defined through the list of organizational entities 1010 and the list of business processes 1020. These two lists are used by the system to span the matrix representation and to populate its cells with as-is, to-be, and target business supports from the information that had been defined by the various users of the system through the workflows described in FIG. 5 through FIG. 9. The as-is, to-be, and target business support identified by the system are represented through the elements 1030.

FIG. 11 represents one form of modification of the incumbent business support map content 1100. Through graphical interactions the user extends the business support provided by the application HR SAP V 3.0 to the process Human Resources Management performed by the organizational entity BU Business Services. A similar graphical interaction is used to define the replacement of application CRM SAP V 3.0 by the successor version CRM SAP V 3.1 as business support for the business process Lead Generation in the organizational entity BU Consumer Products. The system now uses this information to update any other business support map that contains the organizational entity BU Business Services and business process Human Resources Management, or the organizational entity BU Consumer Products and business process Lead Generation. Such automatically updated business support map may be owned by any user of the system.

FIG. 12 represents another form of modification of an incumbent business support map. Starting with the representation of the business support map in FIG. 11, an additional business process, Finance & Controlling 1210, is amended to the business support map's definition. The system automatically amends the associated as-is, to-be, and target business supports resulting in additional elements 1220 and 1230 on the matrix representation.

FIG. 13 displays the business support map as automatically generated by the system for the application Catia V 4.1. Scanning all as-is, to-be, and target business supports as defined for the application Catia V 4.1 the lists of organizational entities 1310 and business processes 1320 are automatically compiled by the system. These lists are used to generate a dynamic business support map which is then populated with the associated as-is, to-be, and target business supports present in the system. The latter are displayed in the form of matrix elements (1330) as discussed before.

The features disclosed in this specification, claims and/or the figures may be material for the realization of the invention in its various embodiments, taken in isolation or in various combinations thereof.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system to manage enterprise Information Technology (IT) support planning, comprising;
 a central database of record; and
 an IT support planning system in communication with the central database of record and including at least one processor configured to execute computer-executable instructions to:
 receive business information items on an enterprise business architecture of an enterprise, and documenting the business information items in the central database of record, and mutually relating the received business information items, wherein the enterprise business architecture provides information about at least two of business units, business processes, or business products of the enterprise;
 receive IT application information items on a plurality of individual IT applications and documenting the IT application information items in the central database of record;
 receive IT support information items on an IT support provided by the plurality of IT applications to the enterprise business architecture, documenting the IT support information items in the central database of record, and relating the plurality of IT applications to the enterprise business architecture according to the received IT support information items; and
 receive as-is IT support information items on an as-is status of the IT support provided by the plurality of IT applications to the enterprise business architecture, documenting the as-is IT support information items in the central database of record, and relating the plurality of IT applications to the enterprise business architecture according to the received as-is IT support information items;
 receive to-be IT support information items on a to-be status of the IT support provided by at least a portion of the plurality of IT applications to the enterprise business architecture, documenting the to-be IT support information items in the central database of record, and relating the plurality of IT applications to the enterprise business architecture according to the received to-be IT support information items;
 receive target IT support information items on a long-term target status of the IT support provided by at least a portion of the plurality of IT applications to the enterprise business architecture, documenting the target IT support information items in the central database of record, and relating the plurality of IT applications to the enterprise business architecture according to the received target IT support information items;
 receive a request for a business IT support map;
 in response to the request for the business IT support map, dynamically generate the business IT support map based on at least a portion of the received business information items, IT application information items, or IT support information items, wherein the generated business IT support map is interactive, wherein the business IT support map comprises a matrix representation of cells, wherein said cells schematically show the enterprise business architecture and the plurality of IT applications providing support to the enterprise business architecture, and wherein the cells provide linkage to the underlying business information items, IT application information items, or IT support information items; and
 provide the business IT support map according to the request.

2. The system of claim 1, wherein the enterprise business architecture includes at least one of business units or business processes, and wherein the IT planning support system further is configured to relate the plurality of IT applications to at least one of the business units or business processes according to the received IT support information items.

3. The system of claim 1, wherein the at least one IT planning support system processor is further configured to execute computer executable instructions to:
 receive change information items; and
 change the relation of the plurality of IT applications to the enterprise business architecture in the central database of record according to the change information items.

4. The system of claim 3, wherein the at least one IT planning support system processor is further configured to execute computer executable instructions to:
 update the business IT support map based at least in part on the change information items.

5. The system of claim 3, wherein the at least one business IT support map is a first business IT support map, and wherein the at least one IT planning support system processor is further configured to execute computer executable instructions to:
 update a second business IT support map based at least in part on the change information items, wherein the second business IT support map is related to the first business IT support map.

6. The system of claim 1, wherein the at least one IT planning support system processor is further configured to execute computer executable instructions to:
 receive IT information items on planned new IT support, and verifying compliance of the planned new IT support with at least one of the as-is status of the IT support, the long-term target status of the IT support, or the to-be status of the IT support.

7. A method for managing enterprise IT support planning, comprising:

receiving business information items on an enterprise business architecture of an enterprise, documenting the business information items in the central database of record, and mutually relating the received business information items, wherein the enterprise business architecture provides information about at least two of business units, business processes, or business products of the enterprise;

receiving IT application information items on a plurality of individual IT applications and documenting the IT application information items in the central database of record;

receiving IT support information items on an IT support provided by the plurality of IT applications to the enterprise business architecture, documenting the IT support information items in the central database of record, and relating the plurality of IT applications to the enterprise business architecture according to the received IT support information items; and receiving as-is IT support information items on an as-is status of the IT support provided by the plurality of IT applications to the enterprise business architecture, documenting the as-is IT support information items in the central database of record, and relating the plurality of IT applications to the enterprise business architecture according to the received as-is IT support information items;

receiving to-be IT support information items on a to-be status of the IT support provided by at least a portion of the plurality of IT applications to the enterprise business architecture, documenting the to-be IT support information items in the central database of record, and relating the plurality of IT applications to the enterprise business architecture according to the received to-be IT support information items;

receiving target IT support information items on a long-term target status of the IT support provided by at least a portion of the plurality of IT applications to the enterprise business architecture, documenting the target IT support information items in the central database of record, and relating the plurality of IT applications to the enterprise business architecture according to the received target IT support information items;

receiving a request for a business IT support map;

in response to the request for the business IT support map, dynamically generate the business IT support map based on at least a portion of the received business information items, IT application information items, or IT support information items, wherein the generated business IT support map is interactive, wherein the business IT support map comprises a matrix representation of cells, wherein said cells schematically showing the enterprise business architecture and the plurality of IT applications providing support to the enterprise business architecture, and wherein the cells provide linkage to the underlying business information items, IT application information items, or IT support information items; and providing the business IT support map according to the request;

wherein the prior operations are performed by one or more IT support planning system computers.

8. The method of claim 7, wherein the enterprise business architecture of the receiving business information items step includes at least one of the business units or business processes, and further comprising, relating the plurality of IT applications to at least one of the business units or business processes according to the received IT support information items.

9. The method of claim 7, further comprising receiving change information items and changing the relation of the plurality of IT applications to the enterprise business architecture in the central database of record according to the change information items.

10. The method of claim 9, further comprising:

updating the business IT support map based at least in part on the change information items.

11. The method of claim 9, wherein the at least one business IT support map is a first business IT support map, further comprising:

updating a second business IT support map based at least in part on the change information items, wherein the second business IT support map is related to the first business IT support map.

12. The method of claim 7, further comprising receiving IT information items on planned new IT support and verifying compliance of the planned new IT support with at least one of the as-is status of the IT support, the long-term target status of the IT support, or the to-be status of the IT support.

* * * * *